Figure 1:
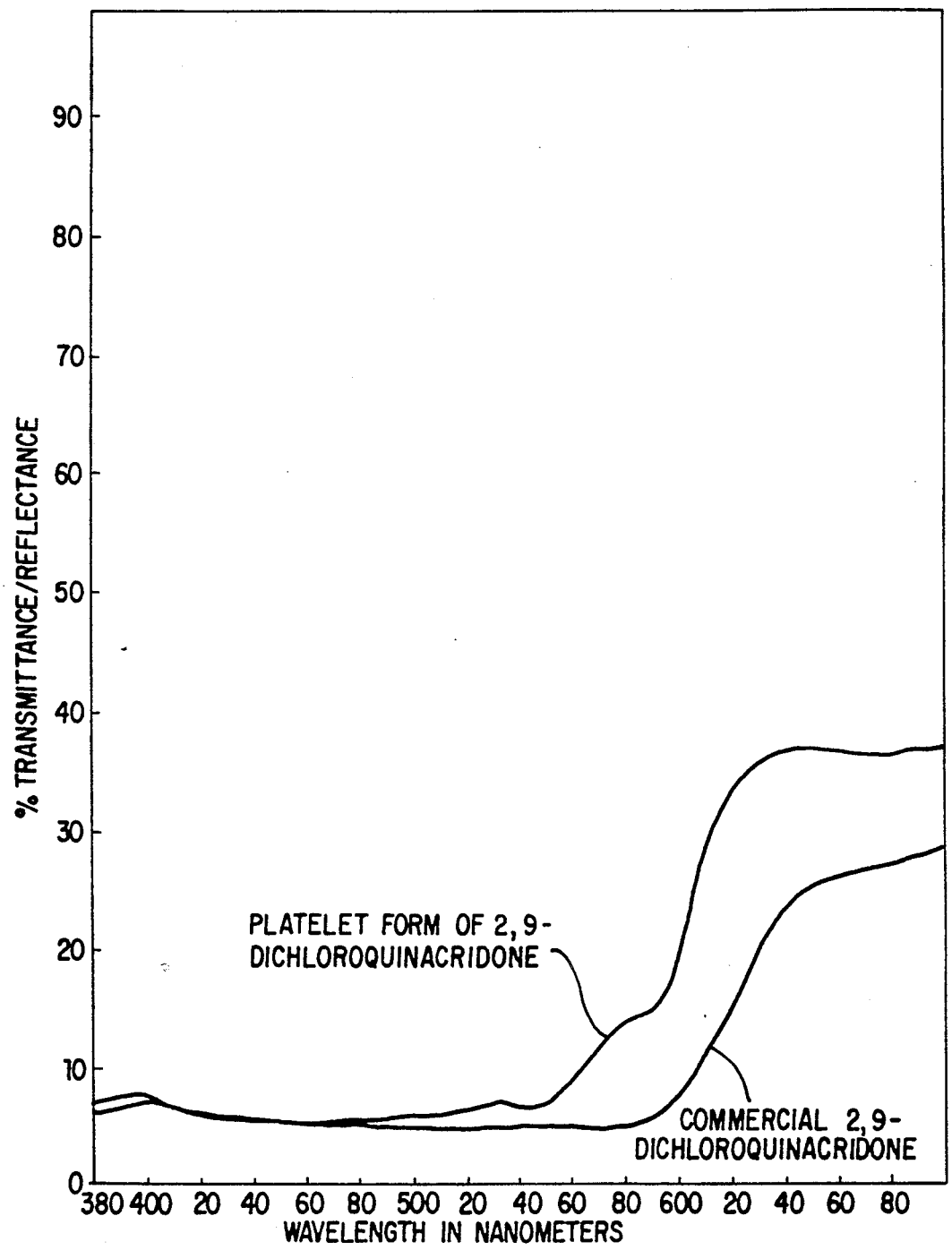

United States Patent [19]
Bäbler et al.

[11] Patent Number: 5,084,573
[45] Date of Patent: Jan. 28, 1992

[54] 2,9-DICHLOROQUINACRIDONE IN PLATELET FORM

[75] Inventors: Fridolin Bäbler, Hockessin; Edward E. Jaffe, Wilmington, both of Del.

[73] Assignee: Ciba-Geigy Corporation, Ardsley, N.Y.

[21] Appl. No.: 552,624

[22] Filed: Jul. 13, 1990

[51] Int. Cl.$^5$ ............................................ C09B 48/00
[52] U.S. Cl. ..................................... 546/56; 106/497
[58] Field of Search .......................... 546/56; 106/497

[56] References Cited

U.S. PATENT DOCUMENTS

| | | | |
|---|---|---|---|
| 4,272,298 | 6/1981 | Bäbler | 106/497 |
| 4,298,398 | 11/1981 | Fitzgerald | 106/497 |
| 4,541,872 | 9/1985 | Jaffe | 546/56 |
| 4,632,704 | 12/1986 | Bäbler | 106/497 |
| 4,801,702 | 1/1989 | Bäbler | 546/56 |

Primary Examiner—Donald G. Daus
Attorney, Agent, or Firm—Harry Falber

[57] ABSTRACT

2,9-Dichloroquinacridone in platelet form having a length of 1–45 μm, a width of 0.1–20 μm and a thickness of 0.05–5 μm; a process for the preparation thereof comprising conversion of the crude material in a polar solvent in the presence of a long chain thiol compound and a base; and the pigmentary use of said platelets.

6 Claims, 1 Drawing Sheet

2,9-DICHLOROQUINACRIDONE IN PLATELET FORM

It is common knowledge in the art of pigments and has often been reported in the relevant literature that the particle size of a pigment must be below a certain limit in order that the pigment meet coloristic requirements. The usual particle size is in the range of from about 0.01 to 1.0 μm. It is, however, also known that the so-called "effect" pigments as metal flakes, graphite or pearl luster pigments consist of fairly large platelet-shaped particles. Formerly, the pearl luster effect was obtained with natural fish-silver, i.e. with guanine dispersions obtainable from fish scales. At the present time, the pearl luster pigments normally consist of inorganic particles in platelet form which may be coated with colored oxide layers such as $Fe_2O_3$ and $Cr_2O_3$ (see K. Dorfner, E. Merck, "Pearl Lustre Pigments", Speciality Chemicals 2 and 3, February and May 1982). A synthetic organic pigment platelet form as an "effect" pigment is disclosed in U.S. Pat. No. 4,370,270. This pigment is a copper phthalocyanine of the β-modification which is synthesized in the form of flakes of at least 10 μm in length and 3 μm in width. When incorporated in stoving varnishes, this pigment gives blue metal effect finishes.

Quinacridones, also referred to as 7,14-dioxo-5,7,12,14-tetrahydroquinolono (2,3-b)acridones are valuable pigments. Many patents describe the preparation of special transparent or opaque quinacridone pigment forms with particle sizes below 1 μm. Furthermore, linear 2,9-dichloroquinacridone of the following formula

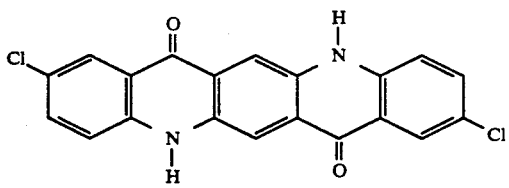

is known to exist in three polymorphic modifications (Chemical Reviews, 67, 1, 1-18(1967)). The bluish red γ-modification is of primary commercial interest.

It is generally known that heat stable organic pigments can be sublimed at high temperatures. By heating 2,9-dichloroquinacridone powder to temperatures above 350° C., oversized thin crystals with a platelike structure of 2-3 μm thickness and 50-150 μm length were grown and their formation was scientifically discussed (Farbe und Lack, 77, 8, 759-769 (1971). However, the reference is silent on the modification of 2,9-dichloroquinacridone in a pigmentary form by such a process.

It has now been surprisingly discovered that crude 2,9-dichloroquinacridone, known to exist in a needle prismatic particle form having a particle size of 0.1 to 5 μm, can be readily and efficiently converted into an "effect" pigment having a platelet-like morphology. Thus, the present invention involves a one-step process for the conversion of crude 2,9-dichloroquinacridone into said platelet form by recrystallization in a polar solvent in the presence of a long chain thiol compound and a base. The resulting platelet form provides excellent luster effects when incorporated in a variety of coating systems.

The novel process for preparation of the platelet form of 2,9-dichloroquinacridone is conducted by stirring the crude 2,9-dichloroquinacridone in a polar solvent together with the aliphatic long chain compound and a base and heating the mixture to temperatures above 50° C., preferably at reflux temperatures, until the conversion is completed, usually 1 to 24 hours depending on the chosen conditions. The conversion can be carried out under pressure, although conversion at atmospheric pressure is preferred. Water may be present during the conversion to the platelet form of this invention in amounts that don't impair the process. When the conversion to the pigment platelets according to the invention is complete, the pigment is filtered, the presscake washed with a solvent followed by water and dried.

Suitable polar solvents are N,N,N',N'-tetramethylurea, N,N-dimethylacetamide, N-methylformamide and preferably N,N-dimethylformamide.

Bases which prove particularly suitable for this purpose are Li-, Na-, K- hydroxides and/or their methoxides, preferably sodium methoxide.

Suitable long chain thiol compounds are for example aliphatic thiols with a carbon chain length of $C_6$ to $C_{18}$, preferably those with $C_{10}$ to $C_{14}$, such as n-decanethiol, n-dodecanethiol and tert.dodecanethiol. n-Dodecanethiol-1 is particularly preferred.

The polar solvent is present in an amount of 5-20 parts, by weight, per part of pigment, and preferably 7 to 14 parts, by weight. A suitable molar ratio of pigment to thiol compound is 1:1.0-5.0, and preferably a ratio of 1:1.5-4.0. The amount of base is preferably adjusted to be equimolar with the thiol compound.

The pigment platelets obtained according to the invention exhibit a length of 1-45 μm, a width of 0.1-20 μm and a thickness of 0.05-5 μm. A particularly preferred pigment contains at least 50% by weight of platelets of 1-20 μm length, 0.1-7 μm width and 0.5-2.0 μm thickness.

The X-ray diffraction pattern of the new platelet form of 2,9-dichloroquinacridone according to the invention is recorded on film to determine the interplanar spacing (d-values) and the double glancing angles. Transmission recording is accomplished with a Guinier camera (Enraf-Nonius FR 522 ®) and Cu-k-alpha-1-radiation (wavelength=1.54060 angstrom). Quartz is used as the calibration substance with the d-values taken from powder diffraction file. The following table presents the d-values of most reflections together with the relative line intensities estimated visually as well as the compounding double glacing angles:

| Interplanar Spacings | | double glancing angles |
|---|---|---|
| d-value in angstroms | intensity | grade 2Θ |
| 16.9 | strong | 5.2 |
| 5.86 | very strong | 15.1 |
| 5.39 | strong | 16.4 |
| 4.63 | medium | 19.2 |
| 3.89 | medium | 22.9 |
| 3.82 | very strong | 23.3 |
| 3.65 | medium | 24.4 |
| 3.36 | medium | 26.5 |
| 3.24 | medium | 27.5 |
| 3.21 | very strong | 27.8 |
| 3.07 | strong | 29.0 |
| 2.92 | very strong | 30.6 |
| 2.29 | strong | 39.4 |
| 2.27 | weak | 39.6 |

-continued

| Interplanar Spacings | | double glancing angles |
|---|---|---|
| d-value in angstroms | intensity | grade 2Θ |
| 2.23 | medium | 40.4 |
| 1.83 | medium | 49.7 |
| 1.81 | medium | 50.4 |
| 1.62 | weak | 56.5 |
| 1.60 | medium | 57.5 |

X-ray diffraction patterns determined by a Phillips-PW1710 X-ray-diffractometer using Cu-k-alpha-1-radiation manifest different reflections depending on the sample preparation of the platelet pigment form.

The new platelet pigment form according to the invention is highly suitable for use as a pigment for coloring high molecular weight organic materials. In comparison to the known γ-crystal modification of 2,9-dichloroquinacridone which is a magenta color in the needle prismatic particle form, the new platelet pigment form has a different and distinct color shade. The color is closest to a copper bronze and in addition manifests a unique strong metallic luster effect not previously observed among organic pigments. The metallic effect can be varied as a function of the polymer in which it is dispersed and the conditions by which the pigment is incorporated.

The new platelet pigment form, according to the invention, is particularly suitable for coloring high molecular weight organic material which can be processed to casted and molded articles and for the pigmentation of lacquers and enamel coating compositions, in particular automotive coating paints.

By molded articles are meant in particular those obtained by orienting stress, for example molding and casting ribbons of fibers and rolled sheets. Thermoplastics, thermoset plastics or elastomers which can be processed to molded articles are, for example, cellulose ethers, cellulose esters such as ethyl cellulose, linear or crosslinked polyurethanes, linear, crosslinked or unsaturated polyesters, polycarbonates, polyolefins such as polyethylene, polypropylene, polybutylene or poly-4-methylpent-1-ene, polystyrene, polysulfones, polyamides, polycyclamides, polyimides, polyethers, polyether ketones such as polyphenylene oxides, and also poly-p-xylylene, polyvinyl halides such as polyvinyl chloride, polyvinylidene chloride or fluoride, polytetrafluoroethylene, polyacrylonitrile, acrylic polymers, polyacrylates, polymethacrylates, rubber, silicone polymers, phenol/formaldehyde resins, epoxy resins, styrene-butadiene rubber, acrylonitrile-butadiene rubber or chloroprene rubber, singly or in mixtures.

Examples of suitable coating compositions are heat-curable coatings, air drying or physically drying coatings or cross-linking chemically reactive coatings, especially stoving finishes which contain the customary binders which are reactive at high temperature, for example those selected from the group consisting of acrylic alkyd, epoxy, phenolic, melamine, urea, polyester, polyurethane, blocked isocyanate, benzoguanamine or cellulose ester resins, or combinations thereof. Suitable air drying or physically drying coatings are in particular the conventional lacquers used especially in the cosmetics industry, for example for the preparation of nail varnishes, and known to the skilled person, for example nitrocellulose lacquers.

The pigment can be used in coatings conventionally employed in the automobile industry, especially in acrylic/melamine resin, alkyd/melamine resin or thermoplastic acrylic resin systems, as well as in aqueous based coating systems.

The high molecular weight organic compounds mentioned can be present individually or in mixtures as plastic materials, melts or in form of spinning solutions, lacquers, paints as well as aqueous paints or printing inks. Depending on the intended use, it is found to be advantageous to use the new platelet pigment form according to the invention as a toner or in the form of formulated preparations.

Based on the high molecular weight organic material to be pigmented, the new platelet pigment form, according to the invention, can be used in an amount of 0.01 to 30% by weight, preferably 0.1 to 10% by weight.

The high molecular weight organic substances are pigmented with the new platelet pigment form according to the invention for example by mixing such a new platelet pigment form, if desired in the form of a masterbatch, into these substrates using roll mills or a mixing or grinding apparatus. The pigmented material is then brought into the desired final form by methods such as calendering, pressing, extruding, brushing, casting or injection molding. To produce non-rigid moldings or to reduce their brittleness, it is frequently desirable to incorporate plasticizers into the high molecular weight compounds before the shaping operation. Suitable plasticizers are, for example, esters of phosphoric acid, phthalic acid or sebacic acid. Plasticizers can be incorporated into the polymers either before or after the incorporation of the new platelet pigment of the invention.

Although the new platelet pigment form of 2,9-dichloroquinacridone according to the invention has excellent application properties, it can be further improved by the incorporation of texture improving agents. Suitable texture improving agents are, for example, fatty acids having at least 12 carbon atoms, such as stearic acid or behenic acid; amides, esters or salts thereof, such as magnesium stearate, zinc stearate, aluminum stearate or magnesium behenate; quaternary ammonium compounds, such as tri-($C_1$–$C_4$)-alkylbenzyl-ammonium salts; plasticizers, such as epoxidized soya bean oil; waxes, such as polyethylene wax; resin acids, such as abietic acids, rosin soap, hydrogenated or dimerized rosin; $C_{12}$–$C_{18}$-paraffin-disulfonic acids; alkylphenols; alcohols, such as stearyl alcohol; laurylamine or stearylamine; and aliphatic 1,2-diols, such as dodecane-1,2-diol. Preferred texture improving agents are laurylamine, stearylamine, aliphatic 1,2-diols, stearic acid, amides, salts or esters thereof, epoxidized soya bean oil, waxes or resin acids. These additives can be incorporated in amounts of 0.05 to 20 percent by weight, based on pigment, and preferably 1 to 10%.

Useful new unique color shades can be obtained with the new platelet pigment form according to the invention in admixture with other organic and/or inorganic pigments and/or polymer soluble dyes. Particularly interesting color shades are created when the new platelet pigment form of the invention is used in combination with other "effect" pigments such as pearlescent pigments, graphite and metallic pigments such as aluminum flakes.

Examples of organic pigments are: azo, azomethine, methine, anthraquinone, phthalocyanine, perinone, perylene, dioxazine, diketopyrrolopyrrole, thioindigo, iminoisoindoline, iminoisoindolininone, quinacridone, quinacridonequinone, flavanthrone, indanthrone, anthrapyrimidine or quinophthalone pigments, and also metal complexes of, for example, azo, azomethine or methine pigments. Pigments having good heat resistance and high transparency are especially suitable. Preferred organic pigments are phthalocyanines, anthraquinones, perylenes, diketopyrrolopyrroles, iminoisoindolinones, quinacridones, indanthrones and disazo pigments.

Examples of inorganic pigments are metal oxides such as iron oxide, antimony yellow, lead chromates, lead chromate sulfates, lead molybdates, ultramarine blue, cobalt blue, manganese blue, chrome oxide green hydrated chrome oxide green, cobalt green, and also metal sulfides such as cadmium sulfide, zinc sulfide, antimony trisulfide and cadmium sulfoselenides. Examples of preferred inorganic pigments are lead chromates, lead chromate sulfates, lead molybdates and iron oxides.

Examples of suitable polymer soluble dyes are anthraquinone- or phthalocyanine based dyes or metal complexes of azo dyes, as well as fluorescent dyes such as those of the coumarin, naphthalimide, pyrazoline, acridine, xanthene, thioxanthene, oxazine, thiazine or benzthiazole series.

Examples of pearlescent pigments are natural and synthetic pearlescent pigments such as the silvery-white pearlescent pigments, for example, the so-called natural "fish scale" pigments or, as synthetic pearlescent pigments, basic lead carbonate, bismuth oxychloride, bismuth oxychloride on carrier and, in particular, the titanium dioxide-coated mica pigments. They may also contain other colored metal oxides such as iron oxide, cobalt oxide, manganese oxide or chromium oxide.

The heat resistance, lightfastness and fastness to weathering of the new platelet pigment formed according to the invention are excellent. Furthermore, it can be very readily incorporated into the organic matrix providing homogenous effect colorations with color strength, saturation and opacity.

The following examples further describe the embodiments of the instant invention. In these examples, all parts given are by weight unless otherwise indicated.

EXAMPLE 1

A 1 liter flask equipped with thermometer, stirrer and condenser is flushed with nitrogen and then charged with 190 ml technical N,N-dimethylformamide, 36 ml dodecanethiol-1, 19.0 grams 2,9-dichloroquinacridone crude and 8.1 grams sodium methoxide. The latter are stirred and heated to reflux, whereby the pigment is almost completely dissolved giving a bluish solution. During the 8 hour reflux period, platelets of 2,9-dichloroquinacridone having a copper bronze metallic appearance crystallize out of solution. The suspension is cooled to room temperature and the new platelet pigment is isolated by filtration. The presscake is washed with methanol followed by water and dried at 100° C., affording 18.5 grams lustrous pigment of the following dimensions: length 3-25 $\mu$m, width 1-10 $\mu$m, thickness 0.05-2 $\mu$m. When pulverized, it can be readily incorporated into automotive paints and thermoplastics. Scanning electron photomicrographs of the isolated pigment show particles of marked flakelike to platelet appearance.

EXAMPLE 2

63.0 grams of polyvinylchloride, 3.0 grams epoxidized soya bean oil, 2.0 grams of barium/cadmium stabilizers, 32.0 grams dioctylphthalate and 1.0 gram of the new platelet 2,9-dichloroquinacridone prepared according to Example 1 are mixed together in a glass beaker using a stirring rod.

The mixture is formed into a soft PVC sheet with a thickness of 0.4 mm by being rolled for 8 minutes on a two-roll laboratory mill at a temperature of 160° C., a speed of 25 rpm and a friction of 1:1.2 by constant folding, removal and feeding. The resulting soft PVC sheet is colored in a tinctorially strong lustrous copper bronze shade with excellent fastness to heat, light and migration.

EXAMPLE 3

The procedure described in Example 2 is repeated using 0.5 grams of the new platelet 2,9-dichloroquinacridone and additionally 0.75 grams pigment [IRIODIN Ti-100-MERCK] to give a soft PVC sheet with a bright lustrous bronze colored shade of comparably good fastness properties.

EXAMPLE 4

The following mixture is prepared in a fluid mixer by stirring for about 5 minutes at a speed of 1400 rpm.

92.0 g—vinyl resin (VINNOL H65D-WACKER)
8.0 g—vinyl copolymer (VESTROLIT HIS 7587-HÜLS)
1.5 g—epoxidized soya bean oil plasticizer
2.8 g—barium/cadmium stabilizer
0.7 g—organic phosphite auxiliary stabilizer (IRGASTAB CH-300-CIBA-GEIGY AG)
0.4 g—fatty acid ester (IRGAWAX 370-CIBA-GEIGY AG)
0.2 g—paraffin oil derivative lubricant (IRGAWAX 360-CIBA-GEIGY AG)
0.25 g—benzotriazole derivative light stabilizer (TINUVIN 320-CIBA-GEIGY AG)

A mixture of 1.5 grams of the rigid PVC mixture so obtained, 0.05 grams of the new platelet 2,9-dichloroquinacridone prepared in Example 1 and 0.05 grams of pearlescent pigment (IRIODIN Ti-100-MERCK) is prepared in a Henschel mixer at room temperature for about 3 minutes at a speed of about 2000 rpm. The pigmented rigid PVC mixture so obtained is pressed on a roll mill for 6 minutes at 190° C., 25 rpm and a friction of 1:1.2, and then pressed at 190° C. for 6 minutes on a Bürkle press between chromium-plated steel plates to a thickness of about 1 mm. The pressed sheet so obtained is colored with a lustrous red shade exhibiting excellent fastness to light and weathering.

EXAMPLE 5

A mixture of 1.0 gram of the new platelet 2,9-dichloroquinacridone obtained according to Example 1, 1.0 gram of antioxidant (IRGANOX 1010-CIBA-GEIGY AG) and 1000 grams of high density polyethylene granules (VESTOLEN A 6016-HÜLS) is stirred for 15 minutes in a glass flask on a roller gear table. The mixture is then extruded in two passes in a single screw extruder. The granulate so obtained is molded at 220° C. in an injection molding machine and then post-formed for 5 minutes at 180° C. The moldings are colored with a lustrous bronze-red shade of excellent fastness properties.

EXAMPLE 6

The procedure in Example 5 is repeated with the exception that the polymer is replaced by 1000 grams polystyrene granules to give pressed plates colored with a lustrous bronze-red shade of excellent fastness properties.

EXAMPLE 7

6 grams of the new platelet 2,9-dichloroquinacridone prepared according to Example 1 are stirred into 20 grams of a mixture of the following composition: 50 grams of a mixture of aromatic hydrocarbons (SOLVESSO 150-ESSO), 15 grams of butylacetate, 5 grams of ketoxime-based leveling agent, 25 grams of methyl isobutyl ketone and 5 grams of silicone oil (1% in SOLVESSO 150). After complete dispersion has been attained, 48.3 grams of acrylic resin (51% in xylene/butanol 3:1) (BAYCRYL L 530-BASF) and 23.7 grams of melamine resin (MAPRENAL TTX-HOECHST-55% in butanol) are added. The batch is briefly homogenized, and the resultant coating composition is then sprayed onto a metal sheet and stoved for 30 minutes at 130° C. The finish so obtained has a lustrous bronze-red shade of excellent fastness properties. The enamel is distinguished by very good flow properties and excellent dispersion of the pigments.

EXAMPLE 8

The following ingredients are thoroughly milled for 96 hours in a ball mill:
- 25.2 g—polyester resin, 60% in SOLVESSO 150, (DYNAPOL H 700-DYNAMIT NOBEL)
- 2.7 g—melamine resin, 55% in butanol, (MAPRENAL MF 650-HOECHST)
- 15.5 g—cellulose acetobutyrate (25% in xylene/butyl acetate 1:2)
- 1.1 g—catalyst based on mineral oil/carboxylate (IRGASOL TZ6-CIBA-GEIGY AG)
- 23.3 g—butyl acetate
- 11.6 g—xylene
- 11.6 g—SOLVESSO 150 (ESSO)
- 9.0 g—the new platelet 2,9-dichloroquinacridone obtained according to Example 1

The pigment dispersion is then diluted with a mixture of butyl acetate/xylene/SOLVESSO 150 (in the same proportions as shown above) to a viscosity of about 18 seconds (20° C.) according to DIN 4 and subsequently sprayed onto a metal sheet. After brief exposure to air (2 minutes at about 40° C.), the pigmented primer coating is further coated with a clear unpigmented top coat comprised of:
- 58.3 g—acrylic resin, 60% in xylene, (VIACRYL VC 373-VIANORA)
- 27.3 g—melamine resin, 55% in butanol, (MAPRENAL MF 590-HOECHST)
- 1.0 g—SILICONE OIL A-1% in xylene (BAYER)
- 1.0 g—benzotriazole derivative (TINUVIN 900-CIBA-GEIGY AG)
- 5.4 g—xylene
- 4.0 g—SOLVESSO 150 (ESSO)
- 3.0 g—ethylene glycol acetate The coating is exposed to air for 30 minutes at 40° C. and then stoved for 30 minutes at 135° C.

The lustrous bronze-colored coating so obtained has excellent fastness properties. It has high gloss and distinctness of image. Exposure of the coating to light from an artificial light source or to sunlight produces a distinct glitter effect which results from the pigment particles present in the coating.

EXAMPLE 9

This example illustrates the incorporation of the platelet pigment into high solids enamels.

PIGMENT DISPERSION FORMULATION

Into a ½ pint can is introduced 24 grams of the platelet pigment prepared according to Example 1, following by 68.6 grams of acrylic resin and 57.5 grams of xylene. The mixture is agitated moderately with an impeller stirrer. The dispersion contains 16% pigment and 48% solids at a pigment to binder ratio of 0.5.

CATALYST AND STABILIZER SOLUTION FORMATION

In a gallon jar are mixed with an impeller stirrer 855 grams ethyl acetate, 2039 grams UV-screener solution and 33 grams of an amine solution (N-propylamine in xylene, methanol, butanol). A mixture of 47.0 grams methanol and 156 grams dodecyl benzenesulfonic acid is added and the resulting solution is stirred for 20 minutes.

PAINT FORMULATION 33.4 grams of above described pigment dispersion, 38.2 grams of acrylic resin, 27.0 grams of melamine resin and 28.9 grams of catalyst and stabilizer solution are mixed and diluted with xylene to spray viscosity of 13-17 seconds using No. 4 FORD cup. The paint (masstone) is sprayed onto a primed aluminum panel exposed to ambient air for 10 minutes and stoved for 30 minutes at 130° C.

The lustrous bronze colored coating so obtained has excellent weatherability and a unique color shade. Exposure of the coating to light from an artificial light source or to sunlight produces a distinct glitter effect which results from the pigment particles present in the coating.

FIG. 1 depicts the reflectance spectrum of the above described coating in comparison to a coating prepared in a similar manner but using the commercial γ-2,9-dichloroquinacridone (MONASTRAL Magenta RT-235-D) as pigment, thus demonstrating the dramatic color shade difference of the platelet 2,9-dichloroquinacridone of this invention. The color is characterized by the following instrumental color readings obtained on a spectrophotometer using D65 illuminant, C.I.E. Lab Scale, and a 10 degree observer with specular component included; expressed in L, A, B color space values.

| Coating with | L | A | B |
| --- | --- | --- | --- |
| platelet-2,9-dichloroquinacridone | 40.16 | 31.19 | 23.15 |
| commercial 2,9-dichloroquinacridone | 29.27 | 21.41 | 4.51 |

Summarizing, it is seen that this invention provides a unique process for preparing 2,9-dichloroquinacridone in a new platelet form. Variations may be made in proportions, procedures and materials without departing from the scope of the invention as defined by the following claims.

What is claimed is:

1. 2,9-Dichloroquinacridone in platelet form having a length of 1-45 μm, a width of 0.1-20 μm and a thickness of 0.05-5 μm.

2. A process for the preparation of the 2,9-dichloroquinacridone of claim 1 in platelet and pigmentary form, which comprises recrystallizing crude 2,9-dichloroquinacridone from a polar solvent at elevated temperatures of from 50° C. to reflux temperatures in the presence of a $C_6$–$C_{18}$ thiol compound and an alkali metal hydroxide or methoxide base and recovering the platelets.

3. The process of claim 2, wherein said polar solvent is selected from the group consisting of N,N,N',N'-tetramethylurea, N,N-dimethylacetamide, N-methylformamide and N,N-dimethylformamide.

4. The process of claim 2, wherein said thiol compound has 10–14 carbon atoms.

5. The process of claim 2 conducted in the presence of N,N-dimethylformamide, dodecanethiol-1 and sodium methoxide.

6. The process of claim 2, wherein 5–20 parts, by weight, of said polar solvent are utilized per part, by weight, of the crude 2,9-dichloroquinacridone; the molar ratio of the crude 2,9-dichloroquinacridone to the $C_6$–$C_{18}$ thiol compound is 1:1.0–5.0; and the $C_6$–$C_{18}$ thiol compound and the base are present in substantially equimolar amounts.

* * * * *